Jan. 14, 1936.    R. N. KIRCHER    2,027,537
ELECTRIC TEAKETTLE
Filed Jan. 21, 1935    2 Sheets-Sheet 1

INVENTOR
Ralph N. Kircher
BY
Bottum, Hudnall, Lesher,
McNamara & Michael
ATTORNEY Jan. 14, 1936.  R. N. KIRCHER  2,027,537
ELECTRIC TEAKETTLE
Filed Jan. 21, 1935    2 Sheets-Sheet 2
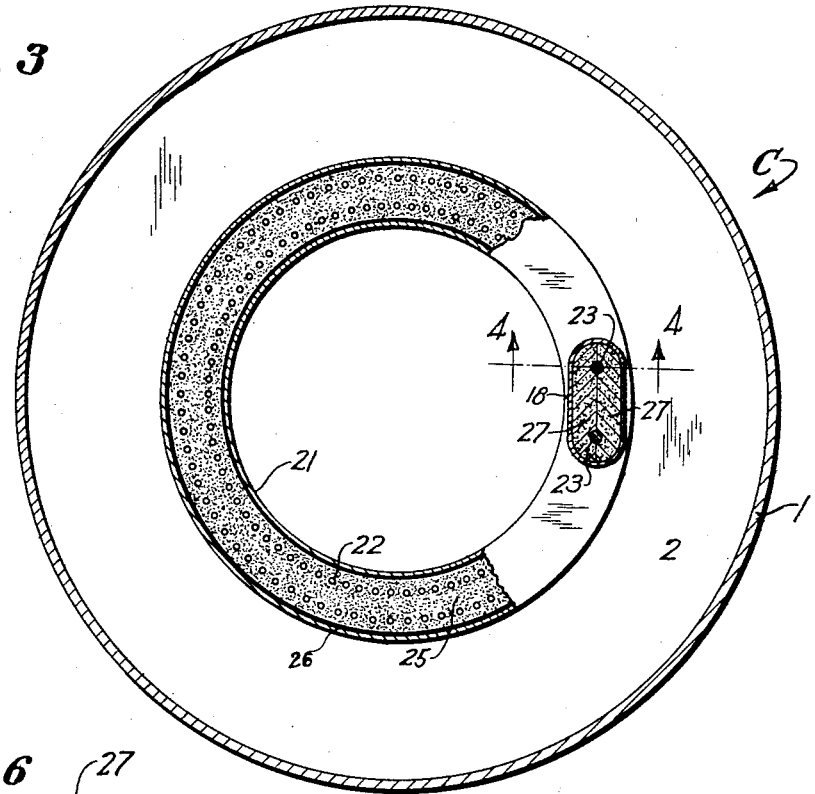
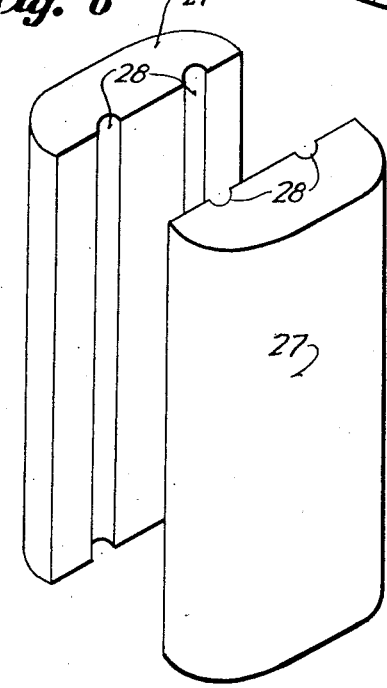
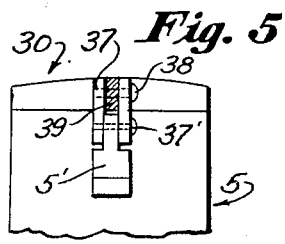
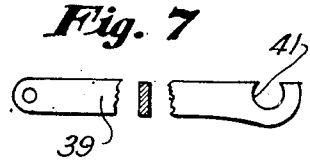
INVENTOR
Ralph N. Kircher
BY
Bettum, Hudnall, Lesher, McNamara & Michael
ATTORNEY Patented Jan. 14, 1936

2,027,537

UNITED STATES PATENT OFFICE 2,027,537

ELECTRIC TEAKETTLE

Ralph N. Kircher, West Bend, Wis., assignor to West Bend Aluminum Co., West Bend, Wis., a corporation of Wisconsin Application January 21, 1935, Serial No. 2,694

12 Claims. (Cl. 219—44)

This invention relates to an electric kettle adapted for domestic use in heating or boiling water.

One of the objects of the invention is to provide a kettle of this character of simple and compact construction, of attractive appearance and which is so constructed and organized as to be highly efficient for its intended purposes.

Another object of the invention is to provide a kettle of this character which may be conveniently handled and which quickly heats or boils water.

Another object is to provide a kettle having these advantages and which may be conveniently manufactured with reasonable economy and from materials and by means of facilities ordinarily available.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 3 is a view in section taken on line 3—3 of Figure 1, parts being shown in elevation for the sake of illustration;

Figure 5 is a fragmentary view of the spout and associated parts as viewed from line 5—5 of Figure 1;

Figure 6 is an isometric projection of sheathing employed for the terminals; and Figure 7 is a fragmentary view partly in elevation and partly in cross section illustrating the link employed between the operating lever and the closure of the spout.

Figure 1:
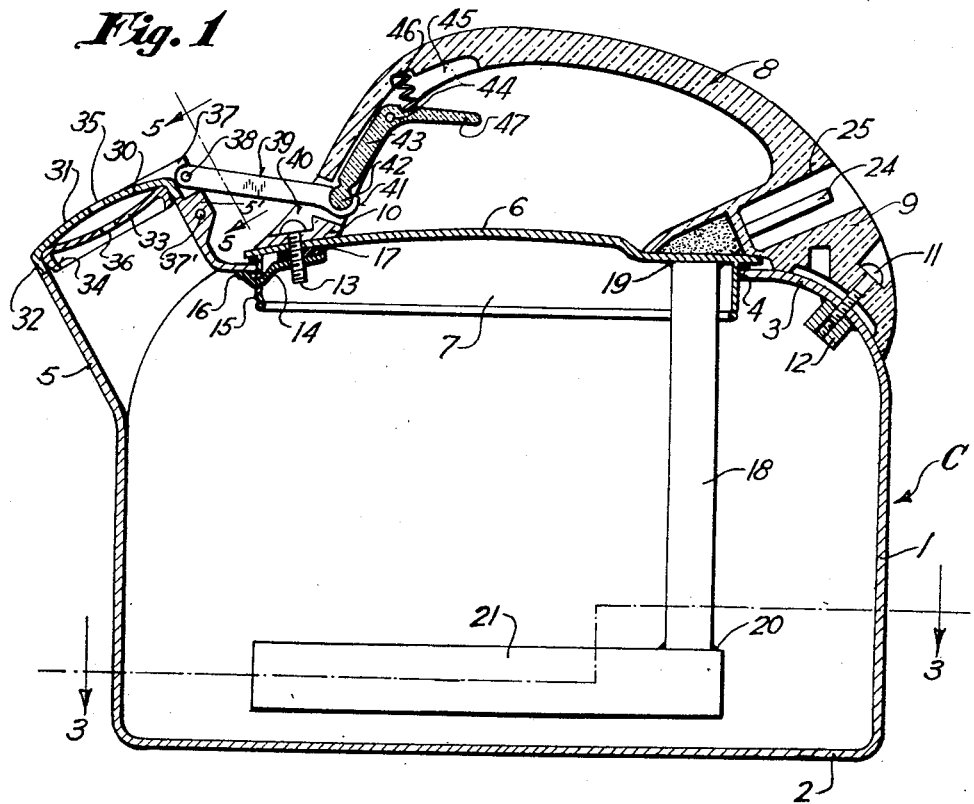
Figure 1 is a view partly in transverse vertical section and partly in side elevation showing a kettle embodying the present invention.

Referring to the drawings, it will be seen that the kettle embodying the present invention comprises a sheet metal container or receptacle designated generally at C and made up of a substantially cylindrical body portion 1 having an integral bottom 2. The upper portion of the container is rounded over as at 3 and is provided with an opening 4. Integral with the body portion 1 is a spout 5.

A metallic lid or cover 6 is provided for the opening in the top of the container. The lid 6 has a depending annular flange 7 which is located inwardly of the peripheral edge of the lid and fits snugly down into the opening 4.

A curved handle 8 of insulating material such as bakelite overlies the lid 6. Its rearward end is enlarged as indicated at 9 and is shaped to fit against a portion of the lid and the rounded portion 3 of the top. The forward end of the handle also has a foot piece 10 which fits snugly against the lid. Screws 11 extend through openings provided in the rearward portion 9 of the handle and are threaded into nuts 12 suitably secured to the rounded portion 3 of the container. The foot piece 10 at the forward end of the handle also has a screw 13 extending through an opening therein and threadedly engageable with a clamping plate or member 14 which extends through an opening 15 of the flange 7 and bears against the upper portion of the container as indicated at 16 so as to clamp the lid in position and complete the securing of the handle. A washer 17 may be provided between the lid 6 and the clamping member 14.

A vertical tubular casing 18 is provided and has its upper end welded or soldered as at 19 to a portion of the lid 6. The lower end of the vertical casing 18 is similarly secured as at 20 to an annular metal casing 21. The vertical casing 18 is also of sheet metal. An electric heating element 22 is disposed in the annular casing 21 and consists of a length of suitable wire such as nickel chromium which is coiled to provide a practically complete annulus. The terminals of this coil 22 are disposed adjacent the lower end of the vertical tubular casing 18 and are suitably secured to terminals 23 which extend up through the casing and having angled upper ends 24 projecting into a socket-like opening 25 formed in the enlarged rearward end of the handle. The heating element 22 is embedded in insulating cement such as indicated at 25 and the cement in turn is surrounded by a layer of mica 26. The terminals, except for their inclined upper ends 24, are encased in a two-part sheath 27 of insulating material and having complementary grooves 28 to receive the vertical portions of the terminals.

Figure 2:
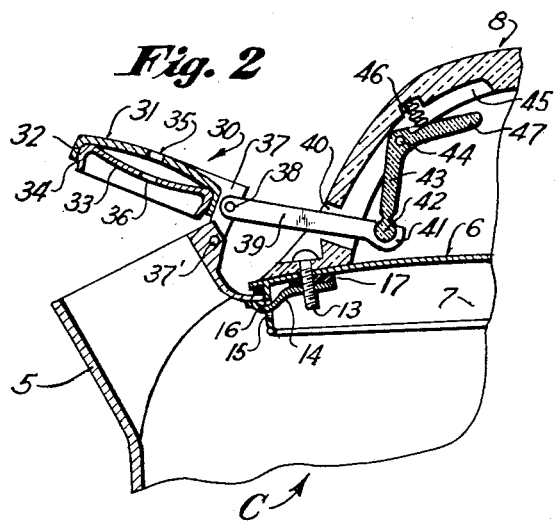
Figure 2 is a fragmentary view similar to Figure 1 but showing the closure for the spout open.
Figure 4:
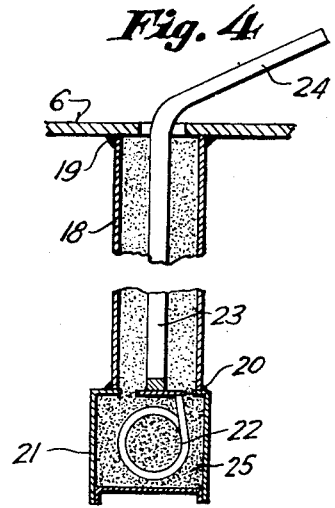
Figure 4 is a similar view in vertical section taken on line 4—4 of Figure 3.

A metallic closure designated generally at 30 is provided for the spout and consists of a dished outer wall 31 flanged as at 32 and receiving and secured to an inner wall 33 oppositely dished with respect to the wall 31 and having a peripheral flange 34 tightly fitted in the flange 32. Rivets or other securing means may be provided to hold the walls 31 and 33 assembled. Centrally, the walls 31 and 33 have openings 35 and 36 so that the closure also provides a whistle. A pair of lugs 37 are provided on the wall 31 and have the lower portions hingedly connected to a projection 5' on the spout 5 as indicated at 37'. The upper portions of the lugs 37 are pivotally connected as at 38 with one end of a link 39. The opposite end of the link 39 extends through an opening 40 in the handle 8 and has a socket 41 having an extent slightly in excess of half a circle. The socket 41 receives a ball-like head 42 provided on a closure operator 43 preferably in the form of an angular operating lever which is pivotally mounted as at 44 in a slot 45 formed in the underside of the handle 8. A spring 46 is disposed between the finger piece 47 of the closure operator and the handle 8 and so biases the closure operator as to tend to maintain the closure closed. The arrangement is such that when one hand is employed to grip the handle 8 and lift the kettle, the index finger may be used to manipulate the closure operator and swing the closure 30 to the open position shown in Figure 2.

A kettle of the character described may be very conveniently handled. It may be filled to the desired extent with water, the water being introduced through the spout, and the water may be conveniently dispensed therethrough when heated. The arched handle 8 is preferably diametrically alined with the spout 5 to facilitate control over pouring and to give better balance to the device. The action of the electric heating element is highly efficient and operates to quickly heat or boil the water. The terminals are in effect water cooled and, of course, their angled upper ends may be conveniently associated with the socket of an ordinary electric cord which may be plugged into a wall socket or otherwise conveniently connected to a source of electricity.

By removing the screw 38 the link 39 may be conveniently disassembled inasmuch as the opening 40 is sufficiently wide to allow the link to be slipped sideways off of the ball 42. Furthermore, the various other elements of the kettle are conveniently accessible for purposes of replacement.

While I have shown and described one construction in which the invention may be advantageously embodied, it is to be understood that this construction has been selected merely for the purposes of illustration or example and that various changes in the size, shape and arrangement of the parts may be made without departing from the spirit of the invention or the scope of the subjoined claims.

The invention claimed is:

1. An electric kettle comprising a container having an opening in its top, a lid therefor, a single vertical tubular casing secured at its upper end to said lid, an annular casing secured to the lower end of said vertical tubular casing and supported thereby, an electric heating element in said annular casing, terminals connected to said heating element and extending up through said tubular casing and projecting through said lid, and an arched handle rigidly secured to the container and having an opening accommodating the portions of the terminals projecting through the lid, said portions of the terminals being accessible through said opening of the handle.

2. An electric kettle comprising a container having an opening at its top, a lid therefor, an electric heating element in said container and suspended from said lid and an arched handle overlying the lid and secured to the underside of said container, said container having a spout, a hinged closure for the spout and an operator for the closure mounted on the underside of said handle so as to be conveniently operable by one of the fingers of the same hand that grips the handle.

3. An electric kettle comprising a container having an opening in its top, a lid for said opening, a handle overlying the lid and having a portion engaged with both the lid and container, means securing said portion of the handle to the container, and an electric heating element disposed in the container and suspended from said lid, said element having terminals accessible from the exterior of the container.

4. A kettle comprising a container having a spout, a closure for said spout hingedly connected thereto, a handle connected to said container, operating means for said closure mounted on said handle and disposed to be operated with the same hand that is employed to grip the handle and comprising an operating lever pivoted to the underside of the handle, and a link connecting the lever to the closure, said handle having an opening through which the link extends.

5. A kettle comprising a container having a spout, a closure for said spout hingedly connected thereto, a handle connected to said container, operating means for said closure mounted on said handle and disposed to be operated with the same hand that is employed to grip the handle and comprising an operating lever pivoted to the underside of the handle, and a link connecting the lever to the closure, said link and lever having an interconnected rounded head and socket, said rounded head being removable from its socket upon lateral shifting relative thereto.

6. An electric kettle comprising a container having an opening in its top, a lid for said opening, a handle overlying the lid and having a portion engaged with both the lid and container, means securing said portion of the handle to the container, and means clamping the other end of the handle to the lid and the adjacent portion of the lid to the container.

7. An electric kettle comprising a container having an opening in its top, a lid therefor, an electric heating element positioned in the container adjacent the bottom thereof, means suspending said element from said lid, an arched handle overlying the lid and fixed in relation to the lid and container, said handle having a socket therein, and terminals for the heating element having ends positioned in said socket.

8. An electric kettle comprising a container having an opening in its top, a lid therefor, an electric heating element positioned in the container adjacent the bottom thereof, means suspending said element from said lid, said container having a spout, a closure for said spout hinged thereto, and an operator for said closure, said operator being connected to the closure and positioned on the underside of the handle whereby the kettle may be handled and said closure operated with one hand.

9. An electric kettle comprising a container having an opening in its top, a lid therefor, a single vertical tubular casing secured at its upper end to said lid, an annular casing secured to the lower end of said vertical tubular casing and supported thereby, an electric heating element in said annular casing, terminals connected to said heating element and extending up through said tubular casing and projecting through said lid, insulating material supporting said heating element in said annular casing, and a sheathing of insulating material positioned in the vertical casing and surrounding the terminals.

10. An electric kettle comprising a container having an opening in its top, a lid therefor, an electric heating element positioned in the container adjacent the bottom thereof, and means suspending said element from said lid, said container having a spout and an arched handle of insulating material overlying the lid and having its lower ends secured to the lid and container.

11. An electric kettle comprising a container having an opening in its top, a lid therefor, an electric heating element positioned in the container adjacent the bottom thereof, and means suspending said element from said lid, said container having a spout and an arched handle of insulating material overlying the lid and having its lower ends engaged with the lid and container and common means for fastening the handle and the lid to the container.

12. An electric kettle comprising a container having an opening in its top, a lid therefor, a vertical tubular casing secured at its upper end to said lid, an annular casing secured to the lower end of said vertical tubular casing and supported thereby, an electric heating element in said annular casing, and terminals connected to said heating element and extending up through said tubular casing and projecting through said lid, said container having a pouring spout and an arched handle of insulating material overlying said lid and secured to the container in diametric alinement with said spout, said handle also having an opening therein receiving the upper ends of the terminals and through which said terminals are accessible.

RALPH N. KIRCHER.